US006635168B2

(12) United States Patent
Zhao et al.

(10) Patent No.: US 6,635,168 B2
(45) Date of Patent: Oct. 21, 2003

(54) GASOLINE SULFUR REDUCTION CATALYST FOR FLUID CATALYTIC CRACKING PROCESS

(75) Inventors: Xinjin Zhao, Woodbine, MD (US); Wu-Cheng Cheng, Ellicott City, MD (US); John Allen Rudesill, Columbia, MD (US); Richard Franklin Wormsbecher, Dayton, MD (US); Pilip Stephen Deitz, Baltimore, MD (US)

(73) Assignee: W. R. Grace & Co.-Conn, Columbia, MD (US)

( * ) Notice: Subject to any disclaimer, the term of this patent is extended or adjusted under 35 U.S.C. 154(b) by 153 days.

(21) Appl. No.: 09/833,601

(22) Filed: Apr. 13, 2001

(65) Prior Publication Data

US 2002/0179492 A1 Dec. 5, 2002

(51) Int. Cl.$^7$ .......................... C10G 11/05; B01J 29/06
(52) U.S. Cl. ............. 208/120.01; 208/113; 208/120.05; 208/120.1; 208/120.15; 208/120.2; 208/120.25; 208/120.35; 502/61; 502/64; 502/65; 502/66; 502/79; 502/300
(58) Field of Search ............................ 208/113, 120.01, 208/120.05, 120.1, 120.15, 120.2, 120.25, 120.35; 502/61, 64, 65, 66, 79, 300

(56) References Cited

U.S. PATENT DOCUMENTS

| | | | |
|---|---|---|---|
| 3,293,192 A | 12/1966 | Maher et al. ................ 252/430 |
| 3,402,996 A | 9/1968 | Maher et al. ................. 23/112 |
| 3,607,043 A | 9/1971 | McDaniel et al. ............ 23/111 |
| 3,676,368 A | 7/1972 | Scherzer et al. ........ 252/455 Z |
| 3,957,689 A | 5/1976 | Ostermaier et al. ......... 252/455 |
| 4,126,579 A | 11/1978 | Flaherty et al. ......... 252/455 Z |
| 4,226,743 A | 10/1980 | Seese et al. ................. 252/453 |
| 4,458,023 A | 7/1984 | Welsh et al. .................. 502/65 |
| 4,515,902 A | * 5/1985 | Shioiri et al. ................. 502/64 |
| 4,606,813 A | * 8/1986 | Byrne et al. ........... 208/120.15 |
| 4,738,941 A | * 4/1988 | Dufresne et al. ............. 502/66 |
| 4,790,982 A | 12/1988 | Yoo et al. ................... 423/239 |
| 4,791,084 A | * 12/1988 | Sato et al. ..................... 502/65 |
| 4,957,718 A | 9/1990 | Yoo et al. ................... 423/244 |
| 4,957,892 A | 9/1990 | Yoo et al. ..................... 502/63 |
| 4,963,520 A | 10/1990 | Yoo et al. ..................... 502/64 |
| 5,376,608 A | 12/1994 | Wormsbecher et al. ........ 502/61 |
| 5,525,210 A | 6/1996 | Wormsbecher et al. ..... 208/122 |
| 6,036,847 A | * 3/2000 | Ziebarth et al. ............ 208/113 |

FOREIGN PATENT DOCUMENTS

CA 967136 5/1975 ................. 252/60

OTHER PUBLICATIONS

Zeolite Molecular Sieves, Structural Chemistry & Use (1974) by D.W. Breck at p. 911.

* cited by examiner

*Primary Examiner*—Walter D. Griffin
(74) *Attorney, Agent, or Firm*—Howard J. Troffkin; Charles A. Cross (57) ABSTRACT

The present invention is directed to certain catalyst compositions and processes that are capable of reducing sulfur compounds normally found as part of the gasoline fraction streams of fluid catalytic cracking processes. The present invention requires an equilibrium cracking catalyst composition comprises at least one Y-type zeolite having kinetic conversion activity of at least about 3 in combination with a Lewis acid containing alumina composite present in at least 50 weight percent of the composition. The resultant equilibrium catalyst composition has a kinetic conversion activity of at least about 2.

29 Claims, 2 Drawing Sheets

GASOLINE SULFUR REDUCTION CATALYST FOR FLUID CATALYTIC CRACKING PROCESS

FIELD OF THE INVENTION

The present invention is directed to an improved catalyst composition useful in fluid catalytic cracking processes. The present catalyst composition is capable of reducing sulfur compounds normally found as part of the gasoline fraction streams of such processes. The present invention is further directed to an improved fluid catalytic cracking process which uses the subject catalyst composition and provides product streams of light and heavy gasoline fractions with substantially lower sulfur-containing compounds.

BACKGROUND OF THE INVENTION

Catalytic cracking is a petroleum refining process which is applied commercially on a very large scale. A large amount of the refinery gasoline blending pool in the United States is produced using a fluid catalytic cracking (FCC) process. In the process, heavy hydrocarbon feedstocks are converted into lighter products by reactions taking place at elevated temperatures in the presence of a catalyst, with the majority taking place in the vapor phase. The feedstock is thereby converted into gasoline, distillates and other liquid fraction product streams as well as lighter gaseous cracking products having four or less carbon atoms per molecule. The three characteristic steps of a catalytic cracking process comprises: a cracking step in which the heavy hydrocarbon feed stream is converted into lighter products, a stripping step to remove adsorbed hydrocarbons from the catalyst material, and a regeneration step to burn off coke formations from the catalyst material. The regenerated catalyst is then recirculated and reused in the cracking step.

Catalytic cracking feedstocks normally contain organic sulfur compounds, such as mercaptans, sulfides and thiophenes as well as other sulfur containing species. The products of the cracking process correspondingly tend to contain sulfur impurities even though about half of the sulfur compounds are converted to hydrogen sulfide during the cracking process, mainly by catalytic decomposition of non-thiophenic sulfur compounds. The thiophenic compounds have been found to be most difficult to remove. The specific distribution of sulfur in the cracking products is dependent on a number of factors including feed, catalyst type, additives present, conversion and other operating conditions, but, in any event a certain proportion of the sulfur tends to enter the light or heavy gasoline fractions and passes over into the product pool. Although petroleum feedstock normally contains a variety of sulfur born contaminants, one of the chief concerns is the presence of unsubstituted and hydrocarbyl substituted thiophenes and its derivatives, such as thiophene, methylthiophene, ethylthiophene, propylthiophene, tetrahydrothiophene, benzothiophene and the like in the heavy and light gasoline fraction product streams of FCC processes. The thiophenic compounds generally have boiling points within the range of the light and heavy gasoline fractions and, thus, become concentrated in these product streams. With increasing environmental regulation being applied to petroleum products, for example in the Reformulated Gasoline (RFG) regulations, there has been numerous attempts to reduce the sulfur content of the products, especially those attributable to thiophenic compounds.

One approach has been to remove the sulfur from the FCC feed by hydrotreating before cracking is initiated. While highly effective, this approach tends to be expensive in terms of the capital cost of the equipment as well as operationally since hydrogen consumption is high. Another approach has been to remove the sulfur from the cracked products by hydrotreating. Again, while effective, this solution has the drawback that valuable product octane may be lost when the high octane olefinic components become saturated.

From the economic point of view, it would be desirable to achieve thiophenic sulfur removal in the cracking process itself since this would effectively desulfurize the major components of the gasoline blending pool without additional treatment. Various catalytic materials have been developed for the removal of sulfur during the FCC process cycle. For example, an FCC catalyst impregnated with vanadium and nickel metal has been shown to reduce the level of product sulfur (See Myrstad et al., *Effect of Nickel and Vanadium on Sulfur Reduction of FCC Naptha*, Applied Catalyst A: General 192 (2000) pages 299–305). This reference also showed that a sulfur reduction additive based on a zinc impregnated alumina is effective to reduce product sulfur in FCC products. However, when mixed with a metal impregnated FCC catalyst, the effect of the sulfur reduction additive was inhibited.

Other developments for reducing product sulfur have centered on the removal of sulfur from the regenerator stack gases. An early approach developed by Chevron used alumina compounds as additives to the inventory of cracking catalyst to adsorb sulfur oxides in the FCC regenerator; the adsorbed sulfur compounds which entered the process in the feed were released as hydrogen sulfide during the cracking portion of the cycle and passed to the product recovery section of the unit where they were removed (See Krishna et al., *Additives Improved FCC Process*, Hydrocarbon Processing, November 1991, pages 59–66). Although sulfur is removed from the stack gases of the regenerator, product sulfur levels are not greatly affected, if at all.

An alternative technology for the removal of sulfur oxides from regenerator stack gases is based on the use of magnesium-aluminum spinels as additives to the circulating catalyst inventory in the FCC unit. Exemplary patents disclosing this type of sulfur removal additives include U.S. Pat. Nos. 4,963,520; 4,957,892; 4,957,718; 4,790,982 an others. Again, however, sulfur content in liquid products, such as gasoline, was not greatly affected.

A catalyst composition to reduce sulfur levels in liquid cracking products has been described by Wormsbecher and Kim in U.S. Pat. Nos. 5,376,608 and 5,525,210, which teachings are incorporated in their entirety by reference. The reference proposes the addition of low amounts of an additive composed of an alumina-supported Lewis acid to conventional zeolite containing cracking catalyst. Although this system has the advantages of causing sulfur reduction in the cracking process, it is generally believed that use of greater than about 10 weight percent of the described additives in their composition does not provide a benefit (e.g. high sulfur removal while retaining the selectivity of other products) proprtional to the level of the additive. In view of the fact that an FCCU can only contain a fixed amount of fluidized particulates, the inclusion of additives, such as the alumina-supported Lewis acid additives of Wormsbecher and Kim, causes a reduction in the amount of the base cracking catalyst contained in the FCCU and, thus, a proportional reduction in the conversion of heavy feedstock to desired products.

It would be desirable to have a catalyst composition suitable for use in FCC processes wherein the catalyst is capable of significantly reducing the level of thiophenes and their derivatives from light and heavy gasoline fractions while substantially retaining conversion of feedstock to desired product.

It would further be desirable to have a catalyst suitable for use in FCC processes wherein the catalyst is capable of performing the reduction of the levels of thiophene and its derivatives as part of the functions of the process conducted in an FCCU.

It would still further be desirable to have a catalyst suitable for use in FCC processes wherein the catalyst is capable of substantially reducing the levels of thiophene and its derivatives as part of the functions of the FCC process while substantially maintaining the overall cracking activity and product selectivities.

BRIEF DESCRIPTION OF THE DRAWINGS

FIGS. 1 and 2 provide a graphic representation of the reduction of sulfur content of catalyst of the present invention while maintaining a high octane product with a comparison to a commercial silica-sol FCC catalyst (Orion sold by W. R. Grace & Co.-Connecticut) and a catalyst composition of the present invention.

SUMMARY OF THE INVENTION

Figure 1:
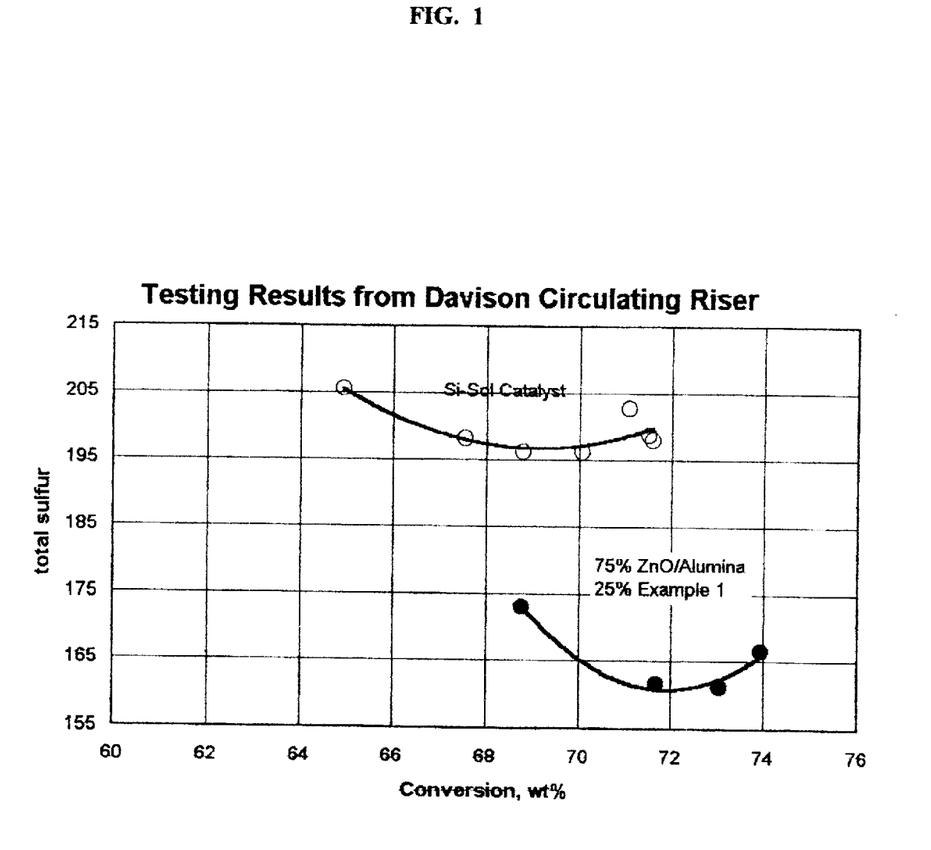
FIG. 1 graphically illustrates the relationship of the conversion of feed stock versus the total gasoline sulfur content for each of the two catalysts.
Figure 2:
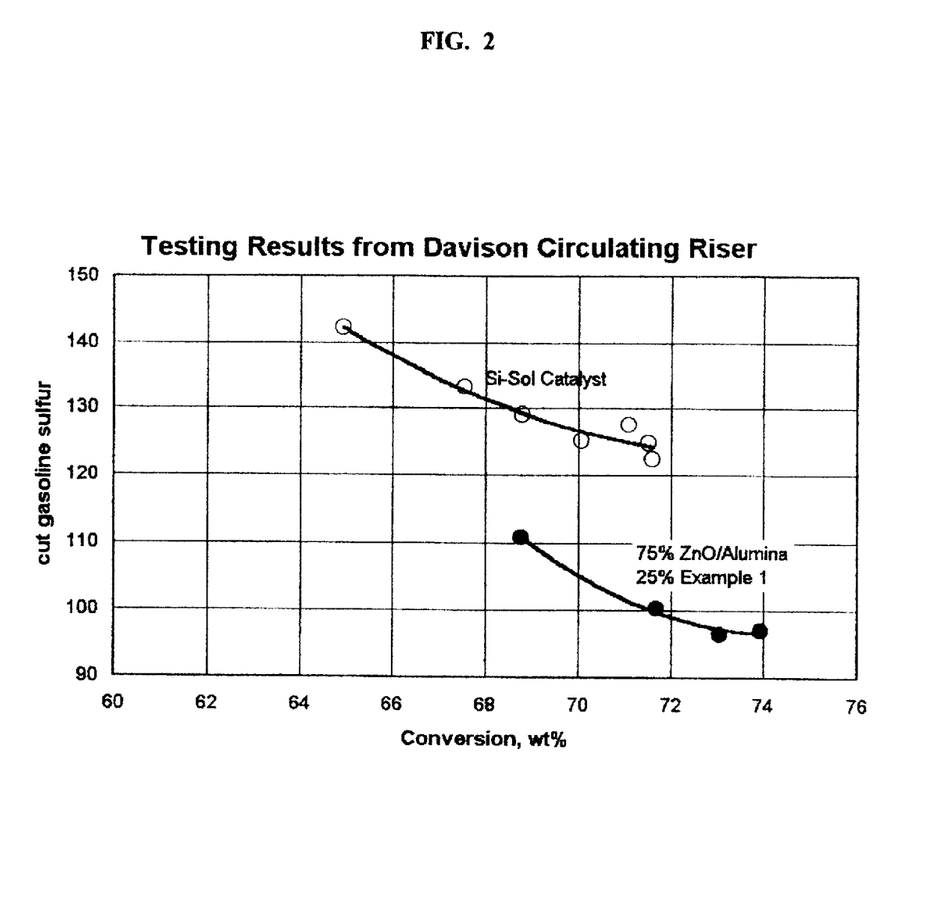
FIG. 2 graphically illustrates the relationship of the conversion of feed stock versus the the conversion of cut gasoline sulfur content.

The present invention is directed to improved catalyst compositions, and FCC processes using the same, which provides a reduced sulfur (e.g., thiophenes and derivatives thereof) content in light and heavy gasoline fractions of the FCC processes. Further, the catalyst compositions of the present invention exhibit increased removal of sulfur in the light and heavy gasoline fractions retrieved from an FCCU.

Specifically, the present invention is directed to a FCC catalyst composition composed of Lewis acid-containing alumina and Y-type zeolite containing catalyst to provide a composition having a kinetic conversion activity, as defined herein below, of at least 2 for a simulated equilibrium cracking catalyst composition of the present invention.

DETAILED DESCRIPTION OF THE INVENTION

The present invention is directed to catalyst compositions that are useful in fluid catalytic cracking (FCC) processes. The present catalyst composition can be used as the inventory of catalytic material contained in an FCCU without changing the mode of operating the process.

The compositions comprise a Y-type silica-alumina zeolite catalyst composition in combination with the Lewis-acid containing alumina material, as fully described herein below. The Lewis-acid containing alumina material must be present in at least 50 weight percent of the total catalyst composition and the resultant composition has a simulated equilibrium activity of from at least about 2. The present invention further comprises an improved FCC process wherein a sulfur containing hydrocarbon feedstock is contacted with the present FCC catalyst composition in an FCCU.

Fluid cracking catalysts are fine porous powdery materials composed of the oxides of silicon and aluminum. In certain instances other elements may also be present in small amounts. Under FCCU reactor conditions carbocation reactions occur to cause molecular size reduction of petroleum hydrocarbons feedstock introduced into the reactor. When aerated with gas, the catalytic powdery material attains a fluid-like state that allows it to behave like a liquid. This property permits the catalyst to have enhanced contact with the hydrocarbon feedstock and to be circulated between the reactor and the other units of the overall process (e.g., regenerator). Hence, the term "fluid" has been adopted by the industry to describe this material.

"Fresh" fluid cracking catalyst is catalyst composition, as manufactured and sold.

"Equilibrium" fluid cracking catalyst is the inventory of circulating catalyst composition in an FCC unit once it has reached a steady state within the environment of the FCCU.

"Simulated Equilibrium" refers to fluid cracking catalyst that has been steam treated in the laboratory to simulate an equilibrium cracking catalyst of an FCCU. One such laboratory procedure for attaining simulated equilibrium is to steam fresh catalyst at 1500° F. (816° C.) for 4 hours under one atmosphere of steam. Another deactivation procedure is called CPS (cyclic propylene steam) deactivation which use propylene and air to simulate the REDOX process in addition to the steaming deactivation effect (See American Chemical Society Symposium Series, No. 634, Page 171–183 (1996).

As fresh catalyst equilibrates within an FCCU, it is exposed to various conditions, such as the deposition of feedstock contaminants and severe regeneration operating conditions. Thus, equilibrium catalysts may contain high levels of metal contaminants, exhibit somewhat lower activity, have lower aluminum atom content in the zeolite framework and have different physical properties than fresh catalyst. In normal operation, refiners withdraw small amount of the equilibrium catalyst from the regenerators and replace it with fresh catalyst to control the quality (e.g., its activity and metal content) of the circulating catalyst inventory. The terms "equilibrium catalyst", "spent catalyst" (that taken from an FCC unit); and "regenerated catalyst" (catalyst leaving the regeneration unit) shall be deemed equivalent for purposes of this invention.

Kinetic conversion of a fluid cracking catalyst at a simulated equilibrium state is as measured by the percentage conversion of heavy hydrocarbon feedstock (i.e. the percentage of product formed from a unit of feedstock wherein product is coke and formed material having a boiling point of up to 430° F. (221° C.)) divided by 100 minus the percentage conversion of the heavy feedstock, as defined above.

"Kinetic conversion activity" refers to kinetic conversion measured in accordance in accordance with ASTM microactivity test (ASTM-5154) at a catalyst to oil weight ratio of 4 with a typical gas oil feed, such as described in Table 1 herein below.

The replacement of equilibrium zeolite catalyst by fresh catalyst is normally done on a cost versus activity basis. The refiner must balance the cost of introduction of new catalyst to the inventory with respect to the production of desired hydrocarbon product fractions. It is desired to maintain the kinetic conversion activity of such equilibrium catalysts at a value of at least 2, preferably of from 2 to 3 or higher. However, it has been understood by those skilled in this art that only low amounts of the additive can be present as the additive dilutes the amount of catalyst present and, thus, causes a reduction of the overall activity of the equilibrium catalyst composition to below that desired to provide an economically efficient process (See Krishna et al., *Aditives Improved FCC Process*, supra.) The present FCC cracking catalyst is composed of certain Y-type zeolite containing catalyst material in combination with at least about 50 weight percent of a Lewis-acid containing alumina additive, each of which is fully described herein below. The present composition exhibits high kinetic conversion activity while causing substantial reduction of thiophene and its derivatives present in the FCCU feedstock. Thus the present catalyst composition provides a means of producing an environmentally attractive product in an economically attractive manner.

The zeolite component of the present cracking catalyst composition is Y-type zeolite, such as Y, MgUSY, ZnUSY, MnUSY, HY, REY, CREY, USY and REUSY types of zeolites.

FCC compositions rely on zeolites as its primary source of Kinetic conversion activity. Normally, the term "zeolite" refers to a large mineral group of crystalline materials. However, the present invention specifically relies on the Y-types of zeolites (faujasites) containing base catalyst.

Faujasite is a naturally occurring material but, due to its scarcity and the need to control its composition, it is normally obtained by commercial synthesis. The crystalline structural units of faujasite are tetrahedra, made up of one silicon and four oxygen atoms and one aluminum atom and four oxygen atoms. Tetrahedra form truncated octahedra that unite by means of hexagonal prisms to form faujasite. Each repeating unit of faujasite is a "unit cell" (UC). The junctures between the octohedran and hexagonal prisms, surrounding and defining each opening, are oxygen atoms at the vertices of either the silica or alumina tetrahedra. Thus, twelve oxygen atoms define each opening of the unit cell and these openings are of about 7 to 9 Å.

Standard Y-type zeolite is commercially produced by crystallization of sodium silicate and sodium aluminate. This zeolite can be converted to USY-type by dealumination, which increases the silicon/aluminum atomic ratio of the parent standard Y zeolite structure. Dealumination can be achieved by steam calcination or by chemical treatment.

Both Standard Y an USY types of zeolites can be treated by ion exchange to replace the sodium atoms present with other cations, usually as mixtures of rare earth metals such as cerium, lanthanum, neodyminum, naturally occurring rare earths and mixtures thereof to provide REY and REUSY grades, respectively. These zeolites may be further treated to calcination to provide CREY and CREUSY types of material. Alternately, MgUSY, ZnUSY and MnUSY may be used. These zeolites can be formed by using the metal oxide of Mg, Zn or Mn or mixtures thereof in the same manner as described above with respect to the formation of USY except that magnesium oxide, zinc oxide or manganese oxide is used in lieu of the rare earth metal oxide used to form REUSY The preferred zeolites are USY, REY, REUSY, CREY and CREUSY with the rare earth grades being most preferred. The preparation of these zeolites is described in U.S. Pat. No. 3,293,192 (USY); U.S. Pat. No. 3,402,996 (CREY); U.S. Pat. Nos. 3,607,043 and 3,676,368 (REY and REUSY), which teachings are incorporated herein in their entirety by reference.

The unit cell size (UCS) of zeolite can be measured by x-ray analysis under the procedure of ASTM D3942. The Y-type zeolite found useful in the present catalyst composition has an equilibrium catalyst unit cell size of at least 24.25 Å, preferably from 24.30 to 24.50 Å and more preferably from 24.30 to 24.38 Å. Although both the zeolite, per se, and the matrix of a fluid cracking catalyst contains both silica and alumina, the ratio of $SiO_2/Al_2O_3$ of the catalyst should not be confused with that of the zeolite. When an equilibrium catalyst is subjected to x-ray analysis, it only measures the UCS of the crystalline zeolite contained therein.

There is normally a direct relationship between the relative amounts of silicon and aluminum atoms in the zeolite and the size of its unit cell. This relationship is fully described in Zeolite Molecular Sieves, Structural Chemistry and Use (1974) by D. W. Breck at Page 911, which teaching is incorporated herein in its entirety by reference. The unit cell size of fresh Y-zeolite is about 24.6 to 24.7 Å. This value decreases as the faujasite is subjected to the environment of the FCC regenerator due to removal of the large size aluminum atoms from the crystal structure. Thus, as the faujasite in the FCC inventory is used, its framework Si/Al atomic ratio increases from about 3:1 to about 30:1. The unit cell size correspondingly decreases due to shrinkage caused by the removal of aluminum atoms from the cell structure.

It has been found that the catalyst composition of the present invention is capable of causing removal of thiophene and thiophenic derivatives from the gasoline fractions in higher degrees than conventionally attained while maintaining high conversion activity of hydrocarbon feedstock in a fluid catalyst cracking process. The present catalyst composition is composed of a Y-type zeolite containing catalyst having an equilibrium kinetic conversion activity of at least about 3, preferably from about 3 to about 6, after deactivation to achieve simulated equilibrium. The most preferred Y-type zeolite used herein has an activity of from about 3.5 to 5.5. The present catalyst composition also requires the use of a Lewis-acid containing alumina as a major component of the resultant composition.

As stated above, the activity of the Y-type zeolite containing component of the subject composition must have a kinetic conversion activity of at least about 3. Such activity is measured on a simulated equilibrium Y-type zeolite containing cracking catalyst, that is a catalyst that has undergone steam treatment at 1500° F. (815° C.) for a 4 hour period under one atmosphere of steam. Such treatment provides a catalytic material, which is deactivated to substantially the same degree as that of an equilibrium catalyst of an FCC unit once it has reached a steady state within the environs of an FCCU. The simulated equilibrium catalyst is used in an FCCU and the amount of product formed having a boiling point of up to 430° F. (220° C.) is determined. The activity of a catalyst material is the percentage conversion of the feedstock of the FCCU divided by 100 minus the percentage conversion. This can be observed by reviewing the Breck equation to determine the active sites of a catalyst. Breck defines the relationship of the active sites of a catalyst to its UCS and its content of zeolite as being:

Active sites=(UCS-24.19)115×% zeolite in catalyst

Zeolite FCC catalysts are a class of materials that are composites of alumina and natural or synthetic faujasite. One can achieve the desired activity of the Y-type zeolite required herein by having sufficient amount of a Y-type zeolite in the relevent component of the subject composition, such as having Y-type zeolites present in least about 40, such as at least about 50, preferably at least 60 and more preferably at least 65 weight percent Y-type zeolite containing component. Another method of providing a Y-type zeolite in the catalyst inventory which has the described simulated equilibrium cracking activity is by utilizing zeolite which contains sufficient exchanged rare earth metal ions. When the Y-type zeolite contains rare earth metal ions, the amount of exchanged rare earth metal ions may be from 0 to about 24, preferably from 5 to 24, and more preferably from 8 to 12 weight percent, as rare earth oxide, based on the zeolite. Thus, when using a Y-type catalyst containing exchanged rare earth ions within its structure (e.g. REY or REUSY type zeolites), the rate of replacement of catalyst is normally lower than when using non-rare earth ion containing USY or other Y-type zeolite catalyst. The greater the number of exchanged rare earth ions within the zeolite, the greater the UCS of the resultant zeolite and, therefore, the activity of the simulated equilibrium Y-type zeolite, as required in the present catalyst composition. Conventional zeolite catalysts normally contain low amounts zeolite in an alumina/clay matrix.

Y-type zeolite catalysts of the required activity can be accomplished by increasing the amount of zeolite contained within the alumina-zeolite component of the present catalyst composition and/or increasing the unit cell size of the zeolite component. Preferred catalysts are those formed from zeolite with an alumina sol in the absence of other active matrix components or of clay materials. In this instance, the zeolite can by mixed with preformed alumina sol prior to its converting into an alumina gel or by mixing zeolite with either component suitable of forming al alumina sol prior to formation of the sol and the gel therefrom. Such catalysts and other catalysts suitable herein can be formed by the processes described in concurrently filled U.S. patent application Ser. No. 09/833,603, the teachings of which are incorporated herein in its entirety by reference.

The present FCC catalyst composition further comprises an additive composed of a Lewis-acid containing alumina particulate. This additive may be an integral component of the catalyst matrix (further described herein below) or may be separate particles used in combination with equilibrium FCC catalyst having Y-type zeolite described above.

It has been found that the present invention provides a FCC catalyst composition that can reduce the sulfur content of light and heavy gasoline fractions, normally attributable to thiophenes and its derivatives while retaining high conversion of the feedstock to desired products (as shown by its high activity value). Although such additives have been previously suggested by Wormsbecher et al., supra, it has been conventionally believed that using high amounts of additive with conventional zeolite catalysts causes a lowering of the activity of the resultant catalyst to below acceptable limits. It has now been found that high concentrations of the additive described below, when combined with high activity simulated equilibrium Y-type zeolite catalysts, substantially reduces the presence of sulfur compounds in gasoline fractions of an FCC process while substantially maintaining the high activity of the base catalyst.

The Lewis acid containing alumina is composed of an alumina matrix having a Lewis acid compound as a part thereof. The Lewis acid can be a compound of a metal selected from Ni, Cu, Zn, Ag, Cd, In, Sn, Hg, Tl, Pb, Bi, B, Al (excluding $Al_2O_3$) or Ga or mixtures thereof. The preferred Lewis acids are compounds having a metal selected from Zn, Ti, Co, Mo or Fe or mixtures thereof, more preferably a Lewis acid metal in which Zn is the sole or major component and most preferably herein Zn is substantially the sole metal.

The additive is composed of an alumina particulate substrate, which has been reacted/impregnated with a Lewis-acid compound. The substrate is composed of alumina particulates having a particle size of from 1 to about 150, typically from about 15 to 100 $\mu$m and high surface area of from about 30 to 400 $m^2/g$, preferably from about 150 to 400 $m^2/g$. The particles of alumina are contacted with a solution of a salt of the Lewis acid metal. Typically, aqueous solutions, which contain from about 10 to 20 weight percent of a soluble Lewis-acid metal salt, such as zinc nitrate, chloride, sulfate, and the like, are used to impregnate the alumina to incipient wetness, i.e., substantially fill the substrate pore volume.

The impregnated alumina is then dried under moderate temperatures (e.g., 100 to 150° C.) followed by calcining at temperatures ranging from 200 to 850° C. to remove the anionic component of the Lewis-acid metal salt. The resultant Lewis-acid containing alumina is in the form of metal in its zero valance state or as metal oxide or mixtures thereof. The surface area of the alumina should be as high as possible. Thus, the Lewis-acid metal component would be distributed throughout the alumina to as high a degree as possible. The methodology of incipient wetness impregnation achieves such distribution. Further, stabilization of the surface area of the alumina particulate with lanthana or baria, by known methods, such as incipient-impregnation using an aqueous solution of lanthanum or lanthanum-rich rare earth salt followed by drying and calcining, can further enhance high distribution of the Lewis-acid metal containing alumina. The incipient wetness impregnation of lanthanum or barium can be done simultaneously with or sequentially to the impregnation of the rare earth metal component.

The Lewis acid containing alumina particulate additive contains from about 1 to about 50 weight percent, preferably from about 10 to 40 weight percent of Lewis-acid metal (expressed as metal oxide) and the balance alumina (excluding the small percentage of rare earth metals). The resultant catalyst composition of the present invention contains greater than 50 weight percent of this additive.

The Lewis acid containing alumina additive can be used to form a component of the fluid cracking catalyst matrix or be admixed with the fluid cracking catalyst for introduction into the FCC process unit. The Lewis-acid containing alumina can comprise from at least about 50 to about 75 weight percent of the composition based on total catalyst composition, with from 55 to 75 weight percent being preferred and from 55 to 60 weight percent being most preferred. It has been found that the elevated content of the Lewis acid containing alumina additive, when used with the cracking catalyst with high equilibrium cracking activity, provides a catalyst composition which causes substantial removal of thiophenes and its derivatives as well as other sulfur containing materials from gasoline fractions of an FCC process while retaining high activity of the system.

It has been found that simulated equilibrium catalyst compositions of the present invention have a kinetic conversion activity of at least about 2, with from 2 to 4.5 being readily achieved and in most cases has an activity of from 2 to 4, with from 2 to 4, with from 2 to 3.3 being easily provided.

The cracking catalyst composition of the present invention is especially useful in conventional FCC processes where hydrocarbon feedstocks are cracked into lower molecular weight compounds in the absence of added hydrogen. Typical FCC processes entail cracking a hydrocarbon feedstock in a cracking zone in the presence of cracking catalyst particles. These particles are subsequently passed to a regenerator where they are regenerated by exposure to an oxidizing atmosphere. The regenerated particles are then circulated back to the cracking zone to catalyze further hydrocarbon cracking. In this manner, an inventory of catalyst particles is circulated between the cracking zone and the regenerator during the overall cracking process. Typical FCC processes involve cracking temperatures of about 450 to 600° C. with catalyst regeneration temperature of about 600 to 850° C.

The catalyst particles may be added to the circulating catalyst particle inventory while the cracking process is underway or they may be present in the inventory at the start-up of the FCC operation. The catalyst particles may be added directly to the cracking zone, to the regeneration zone of the cracking apparatus or at any other suitable point. If desired, the cracking catalyst of the invention may be used in combination with other cracking catalysts and/or with conventional additive admixture particles such as SOx reduction additives, metals passivation additions, etc. As with any cracking catalyst, the amount of catalyst used in the cracking process will vary by FCC unit, feedstock, operating conditions and desired output as is well known in the art.

The catalyst particles can be formed by standard techniques, which normally include the steps of mixing the presently required zeolite with clay and, optionally, active matrix material. Binder is then added and the components are formed into a uniform aqueous dispersion followed by drying and, optionally, calcining. Such procedures are disclosed in U.S. Pat. Nos. 3,957,689; 4,126,579; 4,226,743; 4,458,023 and Canadian Patent 967,136. The teachings of these references are incorporated herein in their entirety by reference.

Cracking catalyst particles of the present invention may be composed of various components. The catalyst should be composed of Y-type zeolite containing material(s), described herein above, wherein the Y-type zeolite comprises at least about 40 weight percent of the faugasite component (The example material contains about 75% zeolite) weight percent of the particulate. In addition, the cracking catalyst particulate preferably also contains relatively inactive matrix material (e.g., clays) in about 20 to 50 weight percent and binder (e.g., silica sots or alumina sols) in an amount sufficient to give integrity to the components as a particulate material, such as up to about 25, preferably 5 to 20 weight percent. Further, the cracking catalyst particles may include various active-matrix components (e.g., alumina, silica and porous alumina-silica). The particle size of the Y-type zeolite containing component should be from about 20 to about 100 microns to permit it to be readily used in a fluidized state. The alumina described above, may form all or part of the active-matrix component of the present cracking catalyst. Alternately, the active matrix component may be absent from or composed of other conventional active-matrix agents when the Lewis acid containing alumina may be introduced into the present catalyst composition as separate particulate material. Alternately, all of the components incorporated into each single particle or be comprised of blends of individual particles having different functions. All of the particles of the catalyst composition should have an average particle size ranging from 20 to 100 microns, preferably from 50 to 75 microns. Such particulate material is able to exhibit the fluid properties required throughout the various FCC process units.

The exact amount of sulfur compounds contained in the gasoline fractions produced by conventional FCC process depends on the sulfur content of the feed that is subjected to FCC processing. However, the present FCC catalyst composition provides a means of obtaining desired gasoline fractions at high conversion rates from the FCC process which has a substantial reduction of from about 30% cut gasoline sulfur of substituted and unsubstituted thiophene and its derivatives which normally make-up the majority of the sulfur content of the gasoline cuts. Gasoline cuts from FCC processes normally have a boiling point ranging up to 430° F.(220° C.). In general, the sulfur content of the whole of FCC gasoline cut is over 100 ppm by weight and usually over 500 ppm by weight. When the end point of the cut is greater than 200° C., the sulfur content is often over 1000 ppm by weight and, in some cases, in the order of 4000 to 5000 ppm by weight. Removal of the sulfur contaminants is beneficially accomplished when using the FCC catalyst composition of the present invention.

The FCC process is conducted in conventional FCC units wherein the reaction temperatures range from about 400° to 700° C. with regeneration occurring at temperatures of from about 500° to 850° C. The particulars will depend on the petroleum feedstock being treated, the product streams desired and other conditions well known to refiners. The FCC catalyst (i.e., inventory) is circulated through the unit in a continuous manner between catalytic cracking reaction and regeneration while maintaining the equilibrium catalyst in the reactor with the presently required zeolite UCS and in the presence of the alumina supported zinc coated additive described above.

Normally, the most convenient manner of using the Y-type zeolite and the Lewis-type acid containing alumina particulate materials is to introduce them into the FCCU as separate particles. When used in this manner, the exact proportions of the components of the subject catalyst composition with respect to the particular feedstock being subject to FCC process can be readily achieved. The Y-type zeolite containing component normally is composed of from 20 to 90, preferably from 50 to 80 and more preferably from 60 to 80 weight percent of a Y-type zeolite with the remainder comprising an inorganic oxide matrix. The Lewis acid containing alumina particles are present in amounts of greater than 50 weight percent of the two particulate materials.

Alternately, the two components required herein can be combined to provide an intergated FCC catalyst composition to provide light liquid product having a reduced sulfur content. This may be accomplished by simultaneously spray drying and calcining the two components to provide a combined single particulate composite product having the proper proportions of the two components therein. Specifically the particles can contain from 20 to 40 weight percent of a Y-type zeolite, at least 50 weight percent of Lewis acid containing alumina and the remainder (e.g. from 10 to 30 weight percent) being composed of an inorganic oxide binder.

In either of the above methods of introducing the present catalyst composition to the FCCU the catalyst composition should have greater than 50 weight percent of the Lewis-acid containing component in the composition based on the combined content of Y-type zeolite and Lewis-acid containing alumina components.

The materials introduced in the FCCU may further comprise other conventional materials, such as, for example, octane enhancing catalysts, CO combustion promoters, bottoms cracking promoters and the like as deemed appropriate and in the amounts well known to those skilled in this art.

The FCC process of the present invention is used to transform heavy hydrocarbon feed containing organosulfur compounds into lighter products such as gasoline which has a substantially reduced amount of organosulfur content than normally achieved via conventional processing which either do not use cracking catalyst of a Y-type or do not have high amounts of Lewis acid containing alumina material or both. The process entails contacting the feed in a cyclic catalyst recirculation cracking process with circulating fluid catalytic cracking catalyst inventory of the present invention. The catalyst normally consists of particles having a size of from about 20 to about 100 microns. As stated above the significant steps of the process are those conventionally known comprising: a) introducing the heavy hydrocarbon feedstock into a catalytic cracking zone. There the feedstock is contacted with a source of hot, equilibrium catalyst of the present invention to produce effluent products as well as spent catalyst containing coke and strippable hydrocarbons; b) the effluent which is removed is treated in a manner to separate and remove solids (spent catalyst) from the vapor phase effluent. The vapor phase effluent is transferred to fractionation columns to separate the various light products including gasoline; and c) the spent catalyst is stripped, usually with steam, to remove occluded hydrocarbons from the solid catalyst. The solids are then oxidatively regenerated to produce hot, regenerated catalyst which is returned to the catalytic cracking zone in proportion to maintain the equilibrium conditions.

The effect of the present catalyst composition and process using the same is to reduce the sulfur content, especially those associated with thiophene and its derivatives of the light products (e.g. those of the gasoline fraction having a boiling point of up to about 430° F. or 220° C.) obtained from an FCCU. The degree of reduction readily achieved is at least about 15 weight percent and more commonly of at least about 30 weight percent of organo-sulfur components when compared to product obtained with conventional FCC that either has no Lewis acid containing alumina of a low amounts of Lewis acid and/or is based upon a zeolite cracking catalyst other than that of the Y-type zeolite. The sulfur is generally converted to inorganic form and released as hydrogen sulfide. This material can be readily recovered in normal manners as is conventional for FCC processes. The increased load of increased hydrogen sulfide recovery is not deemed critical nor economically detrimental when taking into consideration the improved, reduced sulfur content light hydrocarbon products formed.

The following examples are given for illustrative purposes only and are not meant to be a limitation on the claims appended hereto. All parts and percentages are by weight unless otherwise indicated.

Further, any range of numbers recited in the present specification or claims, such as that representing a particular set of properties, units of measure, conditions physical states or percentages, is intended to literally incorporate expressly herein by reference or otherwise, any number falling within such range, including any subset of numbers within any range so recited.

Example 1

18416 grams of REUSY zeolite containing 25% moisture, 9.01% $RE_2O_3$, 4.02% $Na_2O$ and having 822 m2/g surface area was slurried in 18 liters of water and mixed with 19048 grams of aluminum chlorohydrol. The mixture was passed through a wet mill to reduce the particle size and spray dried. The spray dried product was calcined and exchanged with ammonium sulfate to lower the $Na_2O$ content. The finished catalyst had 0.46 cc/g $H_2O$ PV, 6.91% $RE_2O_3$, 0.53% $Na_2O$, 468 $m^2$/g zeolite surface area and 93 m2/g matrix surface area. Upon laboratory simulated CPS deactivation (3500 ppm Ni, 5500 ppm V/1450F), the catalysts retained 175 m2/g zeolite surface area, 60 m2/g matrix surface area and had an ASTM microactivity of 75 (or a kinetic conversion activity of 3).

Example 2

6665 grams of REUSY (described above) was added to 3 liters of water, 7143 grams of aluminum chlorohydrol and 905 grams of a concentrated rare earth chloride solution, containing 28% $RE_2O_3$. The mixture was passed through a wet mill and spray dried. The finished catalyst was calcined and exchanged with ammonium sulfate to lower the $Na_2O$ content. The finished catalyst had 0.33 cc/g $H_2O$ PV, 10.49% $RE_2O_3$, 0.46% $Na_2O$, 496 m2/g zeolite area and 61 m2/g matrix surface area. Upon CPS deactivation (3500 ppm Ni, 5500 ppm V/1450F), the catalysts retained 186 m2/g zeolite surface area, 52 m2/g matrix surface area and had a ASTM microactivity of 81 (or a kinetic conversion activity of 4.3).

Example 3

In this example, the high activity Y-type zeolite containing catalyst prepared according to the proceedure of Example 1 was blended with a Lewis-acid containing alumina (ZnO/alumina).

The procedure for making ZnO/Alumina was conducted by impregnating an alumina substrate (surface area of about 350 $m^2$/g; water pore volume of 1 cc/g) which is a commercially available beohmite according to the proceedure described in U.S. Pat. No. 5,376,608 in quantities to produce about 75 kg of product.

Blends containing 25% of the Y-type zeolite catalyst of Example 1 and 75% of the ZnO/Alumina described above were formed. All the blends were deactivated by CPS protocol at 788° C. (1450° F.). The simulated deactivation protocol included 1000 ppm of nickel and 1500 ppm of vanadium. The catalysts were tested in a Grace Davison Circulating Riser (DCR) pilot plant with a gas oil feed. The results were compared to the results obtained by the same method using a commercial catalyst (Orion), which is a Si-sol/REUSY containing catalyst. The feedstock properties as well as the present catalyst properties are shown in Tables 1 and 2 below.

The gasoline range product from each material balance was analyzed with a sulfur GC (AED) to determine the gasoline sulfur concentration. To reduce experimental errors in the sulfur concentration associated with fluctuations in distillation cut point of gasoline, the sulfur species ranging from thiophene to $C_4$-thiophenes in syncrude (excluding benzothiophene and higher boiling S species) were quantitated and the sum was defined as "cut-gasoline S." When benzothiophene is included in the sulfur report, it is refered to as "total gasoline sulfur".

The DCR results are shown in Table 3 below. Compared against reference catalyst Orion, the 75:25 blend of Zn/Alumina and high activity cracking catalyst, showed about 20% cut and total gasoline sulfur reduction. The blend also showed better gasoline selectivity, better bottoms conversion and higher activity than the reference catalyst.

TABLE 1

Feed Properties

|  | Typical | Used |
|---|---|---|
| API | 15–35 | 23.7 |
| Aniline Point, ° C. |  | 80 |
| Sulfur, wt % | 0.01–4 | 0.509 |
| Total Nitrogen, ppm | 0.02–0.3 | 0.093 |
| Basic Nitrogen, ppm | 0.008–0.1 | 0.0336 |
| Conradson Carbon, wt. % | 0–6 | 0.41 |
| K Factor | 11–12.5 | 11.59 |
| Specific Gravity |  | 0.912 |
| Refractive Index |  | 1.5072 |
| Average Molecular Weight |  | 342 |
| Paraffinic Carbons Cp, wt. % |  | 54.8 |
| Naphthenic Ring Carbons Cn, wt. % |  | 24.3 |
| Aromatic Ring Carbons Ca, wt. % |  | 20.9 |
| Distillation, Initial Boiling Point, ° C. |  | 166 |
| Distillation, 5%, ° C. |  | 264 |
| Distillation, 10%, ° C. | 145–315 | 297 |
| Distillation, 20%, ° C. |  | 330 |
| Distillation, 30%, ° C. |  | 356 |
| Distillation, 40%, ° C. |  | 377 |
| Distillation, 50%, ° C. | 315–485 | 397 |
| Distillation, 60%, ° C. |  | 418 |
| Distillation, 70%, ° C. |  | 438 |
| Distillation, 80%, ° C. |  | 468 |
| Distillation, 90%, ° C. | 430–650 | 510 |
| Distillation, 95%, ° C. |  | 550 |
| Distillation, End Point, ° C. |  | 657 |

TABLE 2

PROPERTIES

|  |  |  | Orion | Example 1 | ZnO/Alumina |
|---|---|---|---|---|---|
| CHEMICAL ANALYSIS |  |  |  |  |  |
|  | TV @ 1750 | wt % | 12.8 | 17.5 | 1.9 |
|  | Al2O3 | wt % | 28.2 | 39.9 | 88.9 |
|  | SiO2 | wt % | 64.7 | 50.3 |  |

TABLE 2-continued

PROPERTIES

|  |  |  |  | Orion | Example 1 | ZnO/Alumina |
|---|---|---|---|---|---|---|
|  | Re2O3 |  | wt % | 3.18 | 9.82 | 0.01 |
|  | Na2O |  | wt % | 0.50 | 0.40 | 0.09 |
|  | ZnO |  | wt % | 0.01 | 0.01 | 11.94 |
| Physical Properties (Thermal, 3/1000° F.) |  |  |  |  |  |  |
|  | Surface Area |  | m2/g | 262 | 586 | 81 |
|  |  | ZSA | m2/g | 221 | 500 | 0 |
|  |  | MSA | m2/g | 41 | 86 | 81 |
|  | Unit Cell Size |  | A |  | 24.67 | — |
| After Simulated Deactivation by CPS 1000/1500 ppm Ni/V |  |  |  |  |  |  |
|  | Surface Area |  | m2/g | 155 | 325 | 70 |
|  |  | ZSA | m2/g | 140 | 264 | 3 |
|  |  | MSA | m2/g | 15 | 61 | 67 |
|  | Unit Cell Size |  |  | 24.34 | 24.37 | — |
|  | ABD |  |  | 0.77 | 0.70 | — |
|  | MA ASR |  | m2/g |  |  |  |
| Conversion |  |  | wt % | 68 | 82 | 28 |
|  |  | Hydrogen | wt % | 0.18 | 0.39 | 0.36 |
|  |  | Coke | wt % | 2.9 | 10.2 | 4.2 |

TABLE 3

Testing Results from Davison Circulating Riser

| Catalyst Name | Commercial Catalyst (Orion) | 25% Example 2 75% ZnO/Alumina |
|---|---|---|
| Riser Temp | 970 | 970 |
| Catalyst Temp | 1300 | 1300 |
| Pressure | 25 | 25 |
| Conversion | 72 |  |
| Activity | 9.61 | 7.96 |
| H2 Yield wt % | 0.06 | 0.24 |
| C1 + C2's wt % | 2.12 | 1.99 |
| Total C3 wt % | 5.83 | 5.07 |
| Total C4 wt % | 10.43 | 9.67 |
| Gasoline wt % | 48.91 | 50.19 |
| LCO wt % | 18.84 | 20.25 |
| Bottoms wt % | 9.16 | 7.75 |
| Coke wt % | 4.47 | 4.62 |
| H2S Yield | 0.18 | 0.23 |
| mercaptans | 18.90 | 14.06 |
| Thiophenes | 17.37 | 13.84 |
| methylthiophenes | 39.81 | 33.86 |
| tetrahydrothiophene | 5.50 | 0.00 |
| C2-thiophenes | 42.53 | 33.42 |
| Thiophenol | 4.99 | 3.71 |
| C3-thiophenes | 14.27 | 12.48 |
| methylthiophenol | 7.85 | 6.74 |
| C4-thiophenes | 4.41 | 5.55 |
| benzothiophene | 76.99 | 61.68 |
| light cut sulfur | 105.20 | 81.11 |
| heavy cut sulfur | 18.68 | 18.03 |
| cut gasoline sulfur | 123.88 | 99.14 |
| total sulfur | 200.87 | 160.82 |
| Reduction |  |  |
| light cut sulfur |  | 23% |
| heavy cut sulfur |  | 4% |
| cut gasoline sulfur |  | 20% |
| total sulfur |  | 20% |

What is claimed is:

1. An equilibrium cracking catalyst composition capable of being maintained within a fluid cracking catalyst unit used in cracking hydrocarbon feedstock containing organic sulfur containing compounds, comprising a) Y-type zeolite having kinetic conversion activity of at least about 3, said Y-type zeolite contained within an inorganic oxide matrix;

b) Lewis acid containing alumina composite, said composite being in greater than about 50 weight percent of the composition, said composition having a kinetic conversion activity of at least about 2.

2. The composition of claim 1 wherein the Y-type zeolite is selected from Y, USY, REY, REUSY, CREY, CREUSY, MgUSY, ZnUSY or MnUSY zeolite and mixtures thereof.

3. The composition of claim 1 wherein the Y-type zeolite is selected from USY, REY, REUSY, CREY and CREUSY zeolite.

4. The composition of claim 3 wherein the Y-type zeolite contains rare earth metal ions within the zeolite cell structure.

5. The composition of claim 1 wherein the average unit cell size of the equilibrium zeolite is at least 24.25 Å.

6. The composition of claim 3 wherein the average unit cell size of the equilibrium zeolite is at least 24.25 Å.

7. The composition of claim 5 wherein the zeolite has an average unit cell size of from about 24.3 to 24.5 Å.

8. The composition of claim 6 wherein the zeolite has an average unit cell size of from about 24.3 to 24.5 Å.

9. The composition of claim 5 wherein the zeolite contains rare-earth atoms within the zeolite cell structure.

10. The composition of claim 6 wherein the zeolite contains rare-earth atoms within the zeolite cell structure.

11. The composition of claim 1 wherein component a) is composed of at least 50 weight percent of a Y-type zeolite.

12. The composition of claim 3 wherein component a) is composed of at least 50 weight percent of a Y-type zeolite.

13. The composition of claim 4 wherein component a) is composed of at least 50 weight percent of a Y-type zeolite.

14. The composition of claim 5 wherein component a) is composed of at least 50 weight percent of a Y-type zeolite.

15. The composition of claim 6 wherein component a) is composed of at least 50 weight percent of a Y-type zeolite.

16. The composition of claim 7 wherein component a) is composed of at least 50 weight percent of a Y-type zeolite.

17. The composition of claim 9 wherein component a) is composed of at least 50 weight percent of a Y-type zeolite.

18. The composition of claim 1, 2, 3, 4, 5, 6, 7, 8, 9, 10, 11, 12, 13, 14, 15, 16 or 17 wherein the Lewis acid containing alumina component b) has a metal in its zero valence state or as an oxide selected from the group consisting of Ni, Cu, Zn, Ag, Cd, In, Sn, Hg, Tl, Pb, Bi, B, Al (excluding $Al_2O_3$), Mg, Mn or Ga or mixtures thereof.

19. The composition of claim 17 wherein the Lewis acid containing alumina component b) has a metal in its zero valence state or as an oxide selected from the group consisting of Zn, Ti, Co, Mo or Fe or mixtures thereof.

20. The composition of claim 17 wherein the Lewis acid metal of alumina component b) comprises Zn.

21. The composition of claim 17 wherein the Lewis acid metal of component b) is aluminum.

22. The composition of claim 20 wherein the alumina has a particle size of from 1 to 150$\mu$ and a surface area of from 30 to 400 m$^2$/g.

23. The composition of claim 18 wherein component b) is a Lewis acid containing alumina further containing lanthana or baria or mixtures thereof.

24. The composition of claim 1 wherein the composition comprises particles comprising from 20 to 40 weight percent of said Y-type zeolite as part of component a); greater than 50 weight percent of said component b); and from 10 to 30 weight percent of an inorganic binder: said said Y-type zeolite being present in less than 50 weight percent of Component b).

25. The composition of claim 1 wherein the composition comprises a mixture of particles of component a) comprising from 20 to 90 weight percent of a Y-type zeolite and from 80 to 10 weight percent of inorganic oxide matrix; with particles of component b).

26. The composition of claim 24 wherein the particles of component a) comprises from 60 to 80 weight percent of a Y-type zeolite.

27. An improved process for catalytic cracking of hydrocarbon feedstock which contains organic sulfur compounds comprising contacting in a catalytic cracking reactor of a fluid catalyst cracking unit an inventory of fluid cracking catalyst composition, removing the liquid and gaseous product streams from said reactor, transferring a portion of the inventory to regenerators of said unit to remove contaminants before returning same to the reactor, removing a portion of the inventory from the unit while replacing same with fresh catalyst composition to provide an equilibrium state of said inventory, the improvement comprising having the inventory of fluid cracking catalyst composition in the unit composed of the composition of claim 1, 2 or 3; and recovering a liquid product having a boiling point of up to about 220° C., said liquid product having a sulfur content that is at least 15 weight percent lower than attained by a composition composed of an FCC zeolite catalyst having an equilibrium activity of less than 3 or a Lewis-acid containing alumina in less than 50 weight percent or both.

28. The composition of claim 1, 2, 3, 4, 5, 6, 7, 8, 9, 10, 11, 12, 13, 14, 15, 16, 17, 19, 20, 21, 22, 24, 25 or 26 wherein component b) is present in from 55 to 75 weight percent of the composition.

29. The process of claim 27 wherein component b) of the composition is present in from 55 to 75 weight percent.

* * * * *